United States Patent [19]

Liggett

[11] 4,452,493

[45] Jun. 5, 1984

[54] WIRE WHEEL SIMULATED WHEEL COVER

[75] Inventor: John V. Liggett, Plymouth, Mich.

[73] Assignee: Rockwell International Corporation, Pittsburgh, Pa.

[21] Appl. No.: 401,421

[22] Filed: Jul. 23, 1982

[51] Int. Cl.³ .......................... B60B 7/04; B60B 7/06
[52] U.S. Cl. ............................. 301/37 SS; 301/37 SC
[58] Field of Search ........ 301/37 AT, 37 CM, 37 SS, 301/37 S, 37 SC, 37 H, 108 S, 108 SC; 411/353, 517, 518, 521

[56] References Cited

U.S. PATENT DOCUMENTS

| | | | |
|---|---|---|---|
| 2,712,474 | 7/1955 | Gaylord | 301/37 SS |
| 2,713,515 | 7/1955 | Lyon | 301/37 SS |
| 4,061,400 | 12/1977 | D'Angelo | 301/37 SS |
| 4,346,940 | 8/1982 | Tator | 301/37 AT |

FOREIGN PATENT DOCUMENTS 282380  3/1929  United Kingdom ......... 301/108 SC

*Primary Examiner*—David A. Scherbel

[57] ABSTRACT

A wheel cover device is capable of being mounted on a vehicle wheel including a central hub element and a rim. An annular trim ring makes firm non-sliding contact with the rim and a central support section includes a device for fastening the wheel cover to the central hub element. A plurality of circumferentially spaced spoke elements extend generally radially from the center support section to the trim ring with each of the spoke elements including a first end in the center support section and a second end joined to the trim ring to be capable of transmitting sufficient retaining force thereto to collectively produce the firm, non-sliding contact with the rim. A resilient ring in the center support section provides the retaining force on the first end of each of the spoke elements when the fastening device is fully installed on the center hub element.

10 Claims, 4 Drawing Figures

WIRE WHEEL SIMULATED WHEEL COVER

BACKGROUND OF THE INVENTION

1. Field of the Invention

This invention relates to wheel cover devices and more specifically to a wheel cover device which is mounted centrally on the wheel and includes biasing means for transmitting a retention force to insure firm, non-sliding contact with the rim of the wheel.

2. Description of the Prior Art

There are a number of types of wheel cover devices which are generally accepted for use on vehicle wheels. One popular wheel cover device includes an annular mounting ring including a plurality of gripping devices to make gripping contact with the wheel rim. Wheel covers of this type are like those disclosed in U.S. Pat. Nos. 2,712,474 and 4,274,679. Although these devices have generally been acceptable and are extensively used in the automotive field, any changes in the design of the ornamented portion of the wheel cover device which might add to the weight and any changes to insure broader acceptance for use on wheels from different sources have required that the retaining ring and gripping devices be made heavier and stronger to insure positive retention. Such improvements have further added to the overall weight and cost of the device.

An alternative type of wheel cover device which has sometimes been used includes a configuration which has simulated wire spokes and is basically retained by being centrally mounted on the wheel. U.S. Pat. Nos. 3,965,708; 4,061,400; 4,179,163; 4,217,002 and 4,221,435 disclose a number of these types of covers. Since they do not include a trim ring element which effectively covers up the wheel rim in the region adjacent the tire, these simulated wire wheel covers are significantly lighter. However, the absence of a trim ring element alters the overall appearance of these covers when compared to the other type of wheel covers mentioned hereinabove and may have prevented their full acceptance.

SUMMARY OF THE INVENTION

It is therefore an object of this invention to provide a wheel cover device which is attractive, relatively light weight and inexpensive to provide.

It is a further object of this invention to provide such a wheel cover device which is capable of being mounted on a central hub element of a wheel and includes an annular trim ring portion which can be caused to make firm, non-sliding contact with the rim of the wheel.

These and other objects of the invention are provided in a preferred embodiment thereof in the form of a wheel cover device which is capable of being mounted on a vehicle wheel which includes a central hub element and a rim. An annular trim ring is capable of making firm, non-sliding contact with the rim when the wheel cover device is mounted on the wheel. A center support section includes means for fastening the wheel cover device to the central hub element. A plurality of circumferentially spaced spoke means extends generally radially from the center support section to the trim ring. Each of the spoke means includes a first end in the central support section and a second end joined to the trim ring to be capable of transmitting sufficient retaining force thereto to collectively produce the firm, non-sliding contact with the rim. Biasing means is included in the center support section and is capable of providing the retaining force on the first end of each of the spoke means when the means for fastening is fully installed on the central hub element.

DETAILED DESCRIPTION OF THE PREFERRED EMBODIMENTS

Figure 1:
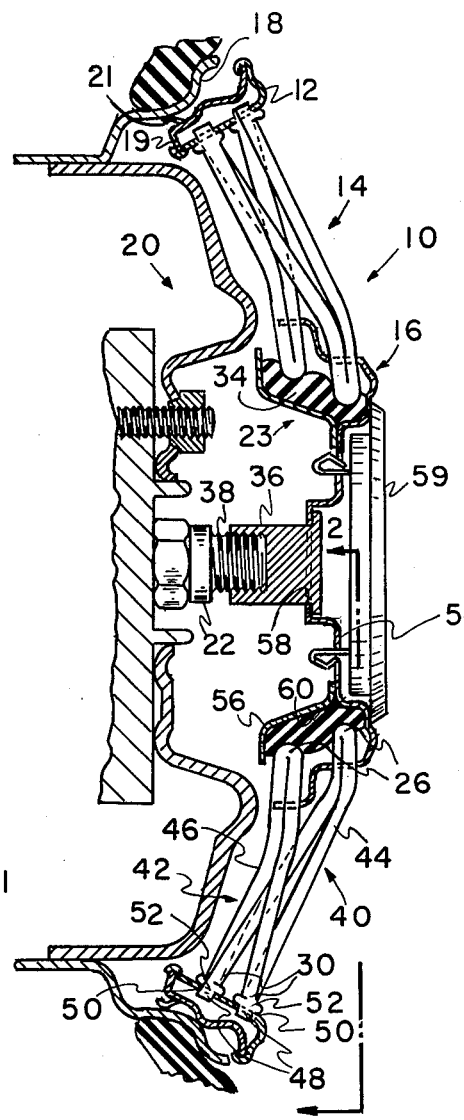
FIG. 1 is a sectional side view of the preferred wheel cover device including various features of the invention.
Figure 2:
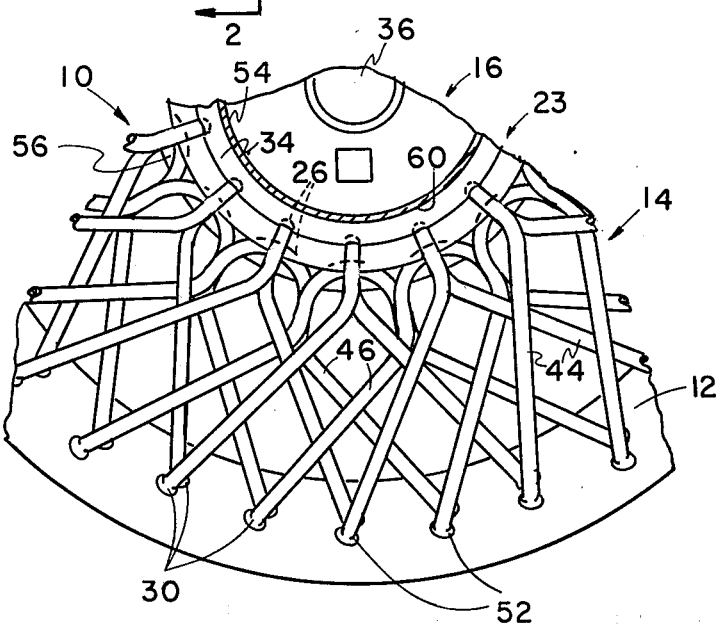
FIG. 2 is a view of the wheel cover device shown in FIG. 1 as seen a long line 2—2.

As seen in FIGS. 1 and 2 the preferred wheel cover device 10 basically includes a trim ring 12, a plurality of wire spoke elements 14 and a center support section 16. The trim ring 12 is annular and is intended to be closely mated with the rim 18 of the wheel 20 to which the wheel cover device 10 is to be mounted. Unlike the prior art wheel cover devices of U.S. Pat. Nos. 2,712,474 and 4,274,679, the trim ring 12 is not designed to make gripping contact with the wheel rim 18 (the purpose and function of the clip 19 will be discussed in detail hereinbelow) but is intended to make firm, non-sliding contact with the rim 18 as the center support section 16 is firmly fastened to a central hub element 22 of the wheel 20 for rotation therewith. Accordingly, since the annular trim ring 12 is not expected to entirely support the wheel cover device, it need not be as heavy or fabricated of as strong material as the prior art devices.

However, in order to provide sufficient retaining force to the ring 12 to firmly hold it in place and to prevent any relative rotation of the wheel cover device 10 during use, it is essential that the center support section 16 be rigidly secured to the central hub element 22 in a manner which will positively transmit force through the plurality of spoke elements 14 and the ring 12 to the rim 18. Although this may appear to be simple from the disclosure of the various prior art patents mentioned above for centrally mounted, simulated wire spoke wheel cover devices, there is a real concern that the addition of a trim ring will complicate manufacture and increase the tolerance requirements to insure retention.

Generally, there are several features which must be considered when a wheel cover device is being designed to mate with vehicular wheels. Obviously, it would be desirable for the wheel cover device to be able to mate with and be mounted on similar vehicle wheels from different sources which may have variations in design dimensions and manufacturing tolerances. For the type of wheel cover devices which utilize retaining rings and fastening clips, the fastening clips are usually designed to extend sufficiently from the retaining ring to provide adequate biasing for gripping various rims while insuring sufficient clearance to prevent contact with the retaining ring. Even though they may accommodate various rims in this manner, as mentioned hereinabove, the weight and strength of the material needed to adequately form the clips and the retaining ring needed for their support have generally increased their cost and made them less acceptable.

Although the center mounting arrangement for the simulated wire wheel covers disclosed in the various patents mentioned hereinabove could significantly reduce the overall weight of wire wheel cover, any design which does not include a trim ring which covers the wheel rim has had only limited acceptance because of aesthetic considerations. Any effort to simply add a trim ring to these types of simulated wire wheel covers would not insure that there would be proper mating with the wheel rim or that firm, non-sliding contact with the rim would be obtained. It has been found that wheel cover devices which are mounted centrally on the wheel (whether they include simulated wire spokes or some other rigid design) are susceptible to either being inadequately mounted on the wheel or too tightly mounted on the wheel because of the inability of the installer to determine when a proper mating with the rim is obtained. For example, if the center support section of the cover is not drawn sufficiently close to the central hub element of the wheel, the retaining force transmitted from the center support section will be inadequate and a firm, non-sliding contact between the trim ring and the rim will not be produced. Under this condition, there would be no positive means for insuring that the wheel cover would continue to rotate with the wheel and any resulting relative rotation might allow the wheel cover to be accidentally removed from the wheel. On the other hand, if the center support section is too tightly drawn toward the central hub element, the retaining force could initially be too great and possible damage to the central support element, plurality of spoke elements or the trim ring could result. Even if some elements of the wheel cover device were made of some type of resilient metal, any inelastic deformation of the wheel cover device could prevent it from being capable of transmitting sufficient force to the ring to eliminate any possibility of relative rotation.

Therefore, in either case, it would be desirable for a centrally mounted wheel cover device to include some means for compensating for wheel tolerances, some means for insuring that inadequate force can be transmitted to the trim ring for the desired firm, non-sliding contact with the rim and some means for insuring that the wheel cover device can be positively and satisfactorily mounted to the wheel without any damage thereto.

These desired features are primarily obtained in the preferred wheel cover device 10 by the inclusion of a biasing means 23 in the center support section 16 which is capable of providing the desired retaining force on the plurality of spoke elements 14 so that they will collectively produce the firm, non-sliding contact with the trim ring 12. To understand the biasing means 23 and how it functions in the preferred wheel cover device 10 or an alternative wheel cover device, it is advisable to refer to FIGS. 3 and 4 which show a simplified version of the invention including only the more significant elements and how they cooperate.

Figure 3:
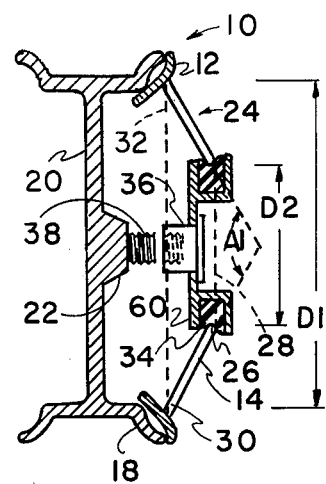
FIG. 3 is sectional side view of a simplified version of the invention to demonstrate how it would appear after assembly but prior to installation on a wheel.

As seen in FIG. 3, the wheel cover device 10 is shown in an assembled configuration prior to being installed on the wheel 20. The trim ring 12 is positioned against the wheel rim 18 but the center support section 16 is not sufficiently close to the central hub element 22 to be positively fastened thereon. The primary reason for this alignment of the assembled but uninstalled wheel cover device 10 is that the plurality of spoke elements 14 are arranged to lie in a frusto-conical configuration 24. The frusto-conical configuration 24 is primarily defined by the first ends 26 of the plurality of spoke means 14 forming a circular top 28. Similarly, the second ends 30 of the plurality of spoke elements 14 form a larger circular base 32 of the frusto-conical configuration 24. Because the trim ring 12 is basically rigid and will not be significantly altered before or after installation on the wheel 20, the diameter D1 of the circular base 32 will effectively remain constant after assembly and after installation.

However, the frusto-conical configuration 24 is designed and expected to be altered from the assembled configuration to an installed configuration. Initially, although shown in an exaggerated manner for demonstration purposes, the frusto-conical configuration 24 includes a conical angle A1. The conical angle A1 is basically established by biasing means 23 in the form of a resilient ring 34 which is supported by the center support section 16 and in turn supports the first ends 26 of the plurality of spoke elements 14.

As a result, the resilient ring 34 establishes a diameter D2 of the circular top 28 for the assembled cover device 10. Although the biasing means 23 does apply some radial outward force to the first ends 26 after assembly which is helpful for manufacturing and assemblying purposes, this feature will be discussed in detail hereinbelow. More significantly, the biasing means 23 in the form of ring 34 initially defines the frusto-conical configuration 24 but is also capable of being radially inwardly deflected by the first ends 26 as the wheel cover device 10 is installed on the wheel 20.

Figure 4:
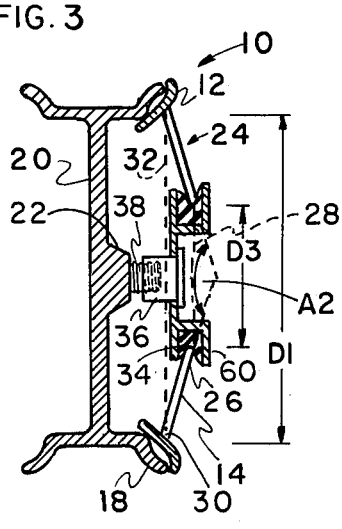
FIG. 4 is sectional side view of a simplified version of the invention to demonstrate how it would appear after being installed on the wheel.

As seen in FIG. 4, the center support section 16 is moved axially toward the central hub element 22 for installation on the wheel 20. Specifically, a rotable nut element 36 of the center support section 16 is matably received on a threaded extension 38 of the central hub element 22. As the nut element 36 is fully received on the extension 38 of the central hub element 22, the axial displacement between the center support section 16 and the trim ring 12 has been reduced. Accordingly, the frusto-conical configuration 24 of the plurality of spoke elements 14 has been altered so that the assembled conical angle A1 no longer exists and a larger conical angle A2 for the frusto-conical configuration 24 is established after installation on the wheel 20. The frusto-conical configuration 24 is capable of being so altered by the fact that the circular top 28 can be reduced against the biasing means 23 to include a diameter D3 which is less than the diameter D2 at assembly. As the first end 26 of each spoke element 14 is moved radially inward, the resilient ring 34 is radially inwardly deflected to produce a retaining force on each spoke element 14. The retaining forces on each spoke element 14 are collectively transmitted to the trim ring 12 to fully establish and produce firm, non-sliding contact with the rim 18. The actual amount of retaining force can be readily designed to insure that there will be no relative rotation of the wheel cover device 10 on the wheel 20 when the nut element 36 is fully installed on the threaded extension 38. As a result, an installer is now capable of being assured that the wheel cover device 10 can be simply and effectively installed on the wheel 20 by simply insuring that the nut element 36 is fully installed on the extension 38. As the wheel cover device 10 is initially positioned against the rim 18 and the nut element 36 is being threaded on the extension 38, the deflection of the resilient ring 34 will produce an increasing retaining force and the installer will thus be able to feel that firm, non-sliding contact is being established until the nut element 38 is so positioned that further rotation is impossible. Furthermore, since the wheel cover device 10 can be designed to insure that the resilient ring 38 will not be fully deflected when used on any number of wheels from different sources, the device 10 cannot be damaged simply by being installed on a wheel.

Returning to the preferred embodiment of FIGS. 1 and 2, the wheel cover device 10 is shown in the fully installed position to generally include the relationships which exist in the simplified version in FIG. 4. Although it can now be seen that the features shown in the simplified version of FIGS. 3 and 4 have been incorporated in the preferred embodiment, it includes other features for ease of assembly and ease of installation. Initially, it should be noted that the preferred plurality of spoke elements 14 is comprised of two sets 40, 42 of wire devices 44 and 46 respectively. The use of two sets 40, 42 are primarily for aesthetic purposes but also add to the overall strength and integrity of the wheel cover device 10. Specifically, each of the wire devices 44, 46 include two wire portions which are angularly separated as they extend from a common first end 26. Each of the wire portions therefore terminate at circumferentially separated locations at the second end 30 to mate with the trim ring 12. This general type of arrangement for a plurality of spoke elements 14 is quite common, and although the first ends 26 of each set 40, 42 might form a circular array having different diameters and being axially separated, the overall configuration still can be said to represent the frusto-conical configuration 24 as described hereinabove for the simplified version of the invention. Similarly, although the second ends 30 are not specifically radially outward of each first end 26, the overall combined effect would be the same since the plurality of spoke elements 14 are capable of transmitting sufficient retaining force to the trim ring 12 in either case.

Because it is desirable in the preferred embodiment of the invention to include the ability to alter the frusto-conical configuration 24 of the plurality of spoke elements 14, it is desirable for the second ends 30 of the spoke elements 14 to mate with the trim ring 12 in a manner which will allow limited angular displacement therebetween. However, it is essential that there be no relative radial movement which would prevent the transmission of the retaining force as produced by the biasing means 23. Accordingly, the preferred design for the second ends 30 is such that a small portion 48 extends through a hole 50 in the trim ring 12 but full insertion of each wire device 44, 46 is prevented by an upset or enlarged region 52. The enlarged region 52 makes contact with the surface of the trim ring 12 to be capable of transmitting the desired force thereto. Therefore, assembly of the spoke elements 14 to the ring 12 is made easier by the fact that each second end 30 can be simply inserted into its appropriate hole 50 without any need or desire for rigid or permanent attachment to the trim ring 12.

The center support section 16 is preferably formed of an outer retainer 54 and an inner retainer 56. The outer retainer 54 includes an opening 58 therethrough which will receive the axially extended portion of the nut element 36. A head of the nut element 36 is capable of applying an axial force to the device 10 as it draws the center support section 16 toward the central hub element 22. An ornamented cover 59 is removably secured to the center support section 16 after installation for aesthetic purposes and to visually conceal the nut element 36.

Prior to assembly, the first ends 26 of the spoke elements 14 are installed in appropriate openings in the outer periphery of the outer retainer 54 to generally position and space each set 40, 42 of spoke elements 14. With the first ends 26 properly positioned and the second ends 30 properly received in the holes 50 of the trim ring 12, the resilient ring 34 can be installed. With the inner retainer 56 either tack welded or otherwise secured to the outer retainer 54, the resilient ring 34 is entrapped therebetween. After assembly, the resilient ring 34 is primarily supported by a generally cylindrical interior surface 60 of the center support section 16 as each of the first ends 26 of the spoke elements 14 are caused to initially produce some inward radial deflection of the ring 34. This initial deflection at assembly does not significantly alter the eventual retaining force created by addition deflection after installation on a wheel. However, it is important when providing the overall assembled wheel cover device 10 to insure that all of the elements will remain in place prior to installation. In other words, the resilient ring 34 applies a radial assembly force to the first end 26 of each spoke element 14 which is sufficient to insure that the second end 30 is retained in its appropriate hole 50 of the trim ring 12 without allowing accidental removal prior to installation. At the same time, the assembled deflection of the resilient ring 34 automatically compensates for a wide range of tolerances which may be desired for the manufacture of any number of the elements composing the wheel cover device 10. Still further, the assembled deflection of the resilient ring 34 prevents any rattling, or loose fitting of the elements to provide an overall assembled wheel cover device 10 which has integrity prior to installation.

The preferred wheel cover device 10 includes another feature which is not shown in the simplified version of FIGS. 3 and 4. The trim ring 12 is preferable provided a plurality of circumferentially spaced clips 19 which in fact make the firm, non-sliding contact directly with the wheel rim 18. The clips 19 are utilized in the preferred ring 12 to allow some axial spacing between the major portion of the trim ring 12 and the rim 18 to accommodate weights (not shown) which are commonly utilized for balancing vehicle wheels. Additionally, each clip 19 includes a radially outwardly extending, resiliently inwardly deflectable alligning tab 21 which is of assistance when installing the wheel cover device 10. Each tab 21 is caused to be inwardly deflected as the wheel cover device 10 is initially positioned on the wheel 20 to basically support the cover 10 as the installer is alligning the nut element 36 with the central hub element 22. The tabs 21 are not intended to produce any type of gripping force on the wheel 20 which would even remotely resemble the type of gripping force which is needed for the type of wheel cover devices having mounting rings as described hereinabove. The clips 19 are also preferred because they provide adequate space for the second ends 30 to be received in the holes 50 in the manner described hereinabove without any possibility of the rim 18 interfering with their retention.

However, it should be clear that an alternative trim ring could be designed to make direct contact with the rim 18 around the entire circumference of each by simply designing a trim ring with a slightly different shaped cross-section. Even the possibility of balancing weights would not prevent a full circumferential contact if desired since balancing weights include only a thin sheet metal portion which extends at the outer periphery of the rim 18. Trim rings are usually made of material with sufficient resilience to accommodate the thin sheet metal portion at the periphery of the rim without interfering with the desired firm, non-sliding contact.

As thus described, the preferred wheel cover device 10 includes a number of features which allow for each of assembly and which insure that installation will be easily obtained without any possibility of damage to the wheel cover device 10. The use of the biasing means 23 can be seen to allow a wide variation in manufacturing tolerances prior to assembly and to be able to accommodate a wide range of wheels which are basically the same size but may vary dimentionally because of being obtained from different sources.

Although the preferred embodiment includes a number of features and elements which are considered desirable, it should be clear, especially from the explanation provided with regard to the simplified version of the invention shown in FIGS. 3 and 4 that a wide range of alternative configurations could be employed without departing from the inventions as claimed. For example, it should be obvious that although two sets 40, 42 of spoke elements 14 are employed, any number or types of spoke means could be similarily arranged to provide a similar frusto-conical configuration. In fact, it would be expected that even wheel configurations including fewer spoke elements which are much wider and not formed of any type of simulated wire material could be employed.

I claim:

1. A wheel cover device capable of being mounted on a vehicle wheel for rotation therewith, said wheel including a central hub element and a rim, said wheel cover device comprising:

an annular trim ring capable of making firm, non-sliding contact with said rim when said wheel cover device is mounted on said wheel;

a center support section including means for fastening said wheel cover device to said central hub element, said center support section having an annular cavity at least partially defined by an interior cylindrical wall;

a plurality of circumferential spaced spoke means extending generally radially from said center support section to said trim ring, each of said spoke means including a first end in extending into said cavity of said center support section and second end joined to said trim ring to be capable of transmitting sufficient retaining force thereto to collectively produce said firm, non-sliding contact with said rim; and biasing means mounted within said cavity of said center support section between said first end of each of said spoke means and said interior cylindrical wall to be capable of providing said retaining force on said first end of each of said spoke means when said means for fastening is fully installed on said central hub element.

2. The wheel cover device as set forth in claim 1, wherein said plurality of said spoke means lies in a frusto-conical configuration with said first ends forming a circular top of said configuration and said second ends forming a larger circular base of said configuration at said trim ring, said circular base having a fixed diameter prior to said wheel cover being mounted on said wheel and after said means for fastening is fully installed on said central hub element.

3. The wheel cover device as set forth in claim 2, wherein said frusto-conical configuration of said plurality of said spoke means has an assembled conical angle prior to said wheel cover device being mounted on said wheel which is less than an installed conical angle when said means for fastening is fully installed on said central hub element and said biasing means in said center support section is deflected to produce said retaining forces as said frusto-conical configuration is changed from said assembled conical angle to said installed conical angle by said means for fastening being fully installed on said central hub element.

4. The wheel cover device as set forth in claim 3 wherein said frusto-conical configuration changing from said assembled conical angle to said installed conical angle occurs when said circular top of said configuration formed by said first ends of said spoke means is reduced from a first diameter to a smaller second diameter against said biasing means as said biasing means is deflected to produce said retaining forces.

5. The wheel cover device as set forth in claim 4 wherein said biasing means is deflected radially inwardly by said first ends of said spoke means and said retaining force on said first end of each of said spoke means is in a radially outward direction.

6. The wheel cover device as set forth in claim 1, wherein said biasing means includes a ring member formed of resilient material.

7. The wheel cover device as set forth in claim 1, wherein said biasing means provides an assembly force on said first end of each of said spoke means to cause said second end to be joined to said trim ring to insure assembly of said center support section, said plurality of said spoke means and said trim ring prior to said means for fastening being installed on said central hub element.

8. The wheel cover device as set forth in claim 7 wherein said second end is joined to said trim ring by said trim ring having a cavity in a surface thereof for limited receipt of said second end therein relative to said surface.

9. The wheel cover device as set forth in claim 1, wherein said trim ring includes a plurality of circumferentially spaced contact elements to produce said firm, non-sliding contact with said rim.

10. The wheel cover device as set forth in claim 1, wherein said trim ring includes resilient aligning means capable of supporting said wheel cover relative to said wheel prior to said means for fastening being installed on said central hub element.

* * * * *